United States Patent [19]

Stampfli

[11] 4,111,230
[45] Sep. 5, 1978

[54] SERVO-CONTROLLED VALVE

[75] Inventor: Harald Stampfli, Petit-Saconnex-Geneva, Switzerland

[73] Assignee: Lucifer S.A., Carouge-Geneva, Switzerland

[21] Appl. No.: 777,671

[22] Filed: Mar. 15, 1977

[30] Foreign Application Priority Data

Mar. 23, 1976 [CH] Switzerland .......................... 3596/76

[51] Int. Cl.$^2$ .......................................... F15B 13/043
[52] U.S. Cl. ............................ 137/625.5; 137/625.64; 137/625.66
[58] Field of Search ............. 137/625.5, 625.6, 625.63, 137/625.64, 625.66

[56] References Cited
U.S. PATENT DOCUMENTS 3,415,284  12/1968  Stampfli .......................... 137/625.66

*Primary Examiner*—Gerald A. Michalsky
*Attorney, Agent, or Firm*—Emory L. Groff, Jr.

[57] ABSTRACT

A servo-controlled valve comprises two valve clacks cooperating with respective seats and mounted on a rod axially movable between two stable positions. Movement of the rod from one stable position to the other is actuated by supplying fluid under pressure to a respective servo-control chamber. When the rod reaches an intermediate unstable position, past which its movement is sustained, the rod actuates opening of an emptying orifice to evacuate the chamber filled with fluid under pressure.

4 Claims, 4 Drawing Figures

SERVO-CONTROLLED VALVE

The invention relates to servo-controlled valves of the type comprising at least two valve members cooperating with respective seats and mounted on a rod axially movable between two stable positions, two servo-control chambers able to be alternately filled with fluid under pressure to initiate said axial movements of the rod from one of said stable positions towards the other, and an arrangement for sustaining movement of said rod towards said other position when during operation the rod reaches an unstable position between said stable positions.

In known valves of this type, the opening and closing movements of the valve members are slowed because emptying of the chamber which produced movement in one direction only takes place when the chamber producing movement in the other direction is filled.

To obviate this drawback, the valve according to the invention is characterized in that each of the servo-control chambers has an emptying orifice cooperating with an obturator the opening of which is controlled by the rod to produce emptying of the chamber filled with fluid under pressure as soon as the rod has passed said intermediate unstable position during its movement from one stable position towards the other.

The accompanying drawings shows, schematically and by way of example, two embodiments of the valve according to the invention and variations of details. In the drawings.

Figure 1:
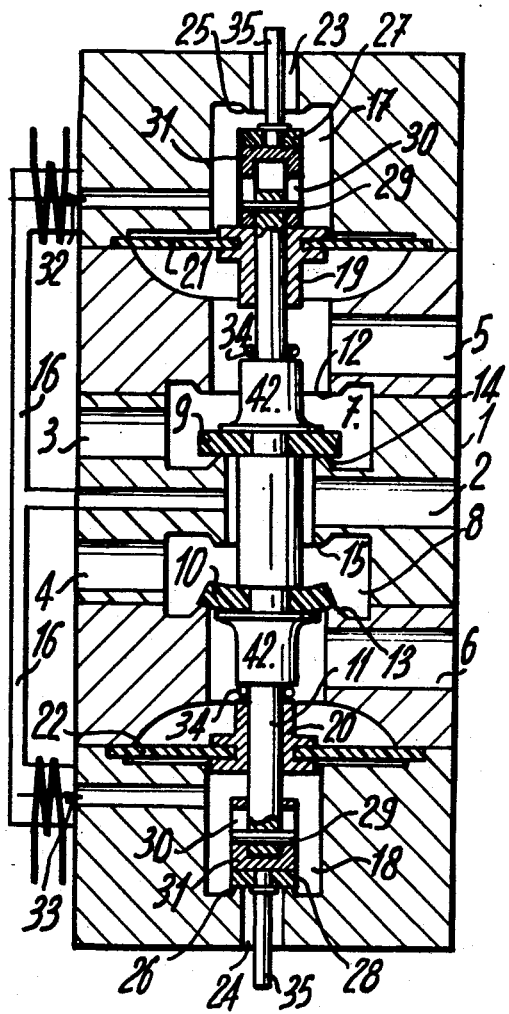
FIG. 1 is an axial cross-section of a first embodiment of valve.

The valve shown in FIG. 1 comprises a body 1 having in its median part a radial inlet duct 2. Symmetrically, above and below the inlet duct 2, are disposed outlet ducts 3, 4 and exhaust ducts 5, 6. The exhaust ducts 5, 6 are connected to respective chambers 7, 8 by axial passages able to be obturated by valve-washers or clacks 9, 10 of elastomeric material mounted on a rod 11 disposed along the longitudinal axis of the valve. The inlet duct 2 is likewise connected to chambers 7 and 8 by axial passages which are also able to be obturated by the clacks 9, 10.

The axial passages connecting the exhaust ducts 5, 6 to the respective chambers 7, 8 have respective seats 12, 13 of greater diameter than corresponding seats 14, 15 of the passages connecting the inlet duct 2 to the chambers 7, 8. As a result, in the position shown in FIG. 1, fluid under pressure in duct 2 exerts a greater thrust on clack 10 than on clack 9. This position is thus a stable position.

Pipes 16 connect the inlet duct 2 to chambers 17, 18 into which the ends of rod 11 penetrate through respective guide sleeves 19, 20 each mounted at the centre of a respective elastic membrane 21, 22 whose peripheral edge is hermetically fixed in the valve body 1. The chambers 17 and 18 have respective orifices 23 and 24 having seats 25 and 26 and able to be obturated by obturators in the form of washers or clacks 27 and 28 each connected with axial play to an end of rod 11, by means of a pin 29 mounted radially at the end of rod 11 and engaged in an oblong radial hole 30 of a support 31 of each clack 27, 28.

Electromagnetic pilot valves 32, 33 mounted on the pipes 16 enable the servo-control of the clacks 9, 10 by supplying fluid under pressure from the inlet duct 2 to chambers 17 and 18.

When the valve 33 is opened, fluid under pressure is delivered to chamber 18 and deforms the membrane 22 which moves the guide sleeve 20 upwards of FIG. 1 against a toric sealing joint 34 in contact with an abutment 42 fixed on the rod 11. Consequently, the clack 10 is lifted up from its seat 13 and the clack 9 from its seat 14. When the clack 9 reaches an unstable position in which the force exerted by the fluid under pressure in the duct 2 on the clack 9 is greater than the force exerted on the clack 10, the pin 29 of the support 31 of clack 28 reaches the upper end of its oblong hole 30 and lifts the clack 28 up from its seat 26, the chamber 18 is connected to the exhaust, and the guide sleeve 20 and membrane 22 resume their initial position, whereas the clacks 9 and 10 continue their upwards movement and come to apply against the seats 12 and 15. The inlet duct 2 is hence connected to outlet duct 3, whereas the outlet duct 4 is connected to exhaust duct 6.

Simultaneously, the clack 27 is brought by the rod 11 onto the seat 25 of the orifice 23 of chamber 17. The valve 33 may be closed again as soon as the chamber 18 is connected to the exhaust.

By opening the valve 32, clacks 9, 10 are brought back to the position of FIG. 1 by a similar operation, during which the clack 27 is lifted from its seat 25 and the chamber 17 connected to the exhaust as soon as the clacks 9, 10 reach an unstable position in which the force exerted by the fluid under pressure of the clack 10 is greater than the force exerted on the clack 9.

It should be remarked that the free section of the orifices 23, 24 is greater than that of the pipe 16 for delivery of fluid under pressure into chamber 17, 18, and enables these chambers to be rapidly emptied. Hence, the movements of rod 11 are not braked or damped by emptying of the chamber (17 or 18) opposite to the chamber (18 or 17) under pressure, or by the resistance of the inactive membrane.

In the embodiment of FIG. 1, the supports 31 are each additionally provided with a rod 35 enabling manual control of the valve.

Numerous constructional variations may be previewed.

Figure 2:
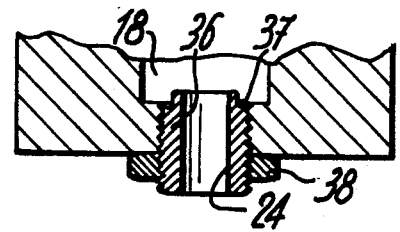
FIGS. 2 and 3 are partial views in axial cross-section of variations of the device for emptying the servo-control chambers.

If one wishes, for example, to be able to adjust the moment of connection to the exhaust, the orifices 23 and 24 may, as shown in FIG. 2, be provided in an externally-threaded sleeve 36 screwed in the ends of the body 1. This sleeve 36 has its inner end a zone 37 which forms a seat for the respective clack 27, 28, and its position is held by a lock nut 38.

Figure 3:
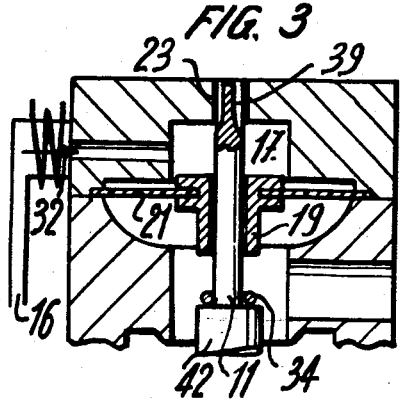

In another variation of the device for emptying the servo-control chambers 17, 18, shown in FIG. 3, the clacks 27, 28 are replaced by discharge grooves 39 in the ends of the rod 11. In this instance, the orifices 23, 24, as shown, have a diameter corresponding to that of the rod 11, or could be provided with a sleeve whose inner diameter corresponds to that of the rod 11.

Figure 4:
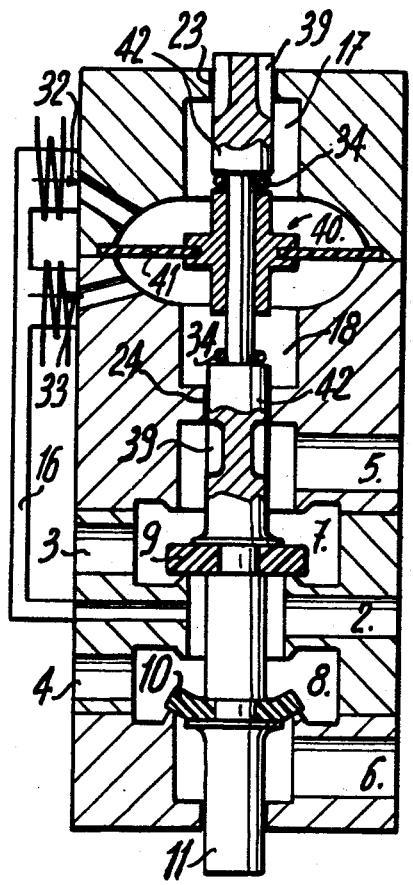
FIG. 4 is an axial cross-section of the second embodiment of valve.

In the embodiment of valve shown in FIG. 4, the servo-control arrangement 17-33 has been grouped at one of the ends of the valve body 1 in the form of a single device 40 with dual-action comprising a single membrane 41 separating the chambers 17, 18 from one another.

Emptying of the chamber 17, 18 takes place by discharge grooves 39 of abutment-forming parts 42 of the rod 11, one of which leads into the exhaust duct 5.

I claim:

1. In a servo-controlled valve comprising at least two valve members cooperating with respective seats and mounted on a rod axially movable between two stable positions, two servo-control chambers, means for alternately filling said chambers with fluid under pressure to initiate said axial movements of the rod from one of said stable positions towards the other, and an arrangement for sustaining movement of said rod towards said other position when during operation the rod reaches an unstable position between said stable positions, the improvement wherein each of the servo-control chambers has means defining an emptying orifice and an obturator cooperating with said orifice, said obturator being operatively connected to the rod to open the orifice and produce emptying of the chamber filled with fluid under pressure as soon as the rod passes said intermediate unstable position during its movement from one stable position towards the other.

2. A valve according to claim 1, in which said obturators are connected to the rod with play in the axial direction of the rod and each arranged to be supported on a further seat formed inside the respective servo-control chamber about its emptying orifice to obturate said orifice during filling the chamber with fluid under pressure, and to be removed from said seat by the rod only when the rod passes by said intermediate unstable position.

3. A valve according to claim 1, in which said obturators are each formed by a part of the rod engaged in the emptying orifice of the respective servo-control chamber to obturate said orifice during filling the chamber with fluid under pressure, another part of the rod comprising means for allowing the evacuation of fluid under pressure through said emptying orifice when the rod passes by said intermediate unstable position.

4. A valve according to claim 1, in which said servo-control chambers comprise at least one elastic membrane secured on a central sleeve slidably mounted on the rod and cooperating with an abutment on the rod to move the rod to said intermediate unstable position in response to the supply of pressurized fluid to a servo-control chamber.

* * * * *